US006785812B1

(12) United States Patent
Botham, Jr. et al.

(10) Patent No.: US 6,785,812 B1
(45) Date of Patent: Aug. 31, 2004

(54) SECURE AND CONTROLLED ELECTRONIC DOCUMENT DISTRIBUTION ARRANGEMENT

(75) Inventors: Douglas Norman Botham, Jr., Johnstown, CO (US); Gerald Ray Martinez, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/483,781

(22) Filed: Jan. 14, 2000

(51) Int. Cl.[7] ............................................... H04L 9/00
(52) U.S. Cl. ...................... 713/168; 713/150; 713/166
(58) Field of Search ................................ 713/168, 150, 713/166

(56) References Cited

U.S. PATENT DOCUMENTS

| | | | | | |
|---|---|---|---|---|---|
| 5,175,765 | A | * | 12/1992 | Perlman | ...................... 380/30 |
| 6,088,799 | A | * | 7/2000 | Morgan et al. | ............. 713/182 |
| 6,519,700 | B1 | * | 2/2003 | Ram et al. | .................. 713/193 |

OTHER PUBLICATIONS

Adobe, *Adobe PDF*, About PDF, Jan. 28, 1999, pp. 1–2; http://www/adobe.com/prodindex/acrobat/adobepdf.html.
Adobe Systems Incorporated, *Portable Document Format Reference Manual*, Version 1.3, Mar. 11, 1999, pp. 68–70 and 114–120, http://partners.adobe.com/asn/developer/PDFS/TN/PDFSPEC.PDF.

Alan E. Bell, Consumer, vol. 36, No. 10, *The dynamic*, pp. 28–35.

Eva Chen, IEEE Spectrum, Aug. 1999, vol. 36, No. 8, *Poison Java*, pp. 38–43.

Maurice J. Bach, AT&T, *The Design Of The UNIX® Operating System*, pp. 6–10, 60–63, and 92–96.

* cited by examiner

*Primary Examiner*—Gilberto Barrón
*Assistant Examiner*—Christopher J. Brown
(74) *Attorney, Agent, or Firm*—David Volejnicek

(57) ABSTRACT

Disclosed is an arrangement for secure and controlled electronic distribution of documents from a server (102) to clients (101) across an electronic network (100), e.g., the Internet. A client requests (200) authentication from the server. The server validates (202) the request and sends (206) a validation and encryption data (129) to the client to establish a secure communications connection with the client. The client returns (210) a request for a document accompanied by the client ID (131) to the server. The server validates (212) the request and uses the client ID to set (216) permissions of the client for the document. The server then uses the encryption data to encrypt (220) the document and its permissions, and sends (224) the encrypted information to the client. The client acknowledges (230) receipt of the document, decrypts (228) it by using the encryption data, and enforces (232) the permissions on the document. The client reports (234) any activity at the client with respect to the document to the server. The server makes a record (236) of the acknowledgement of receipt and of the reports of activity for the document.

19 Claims, 2 Drawing Sheets

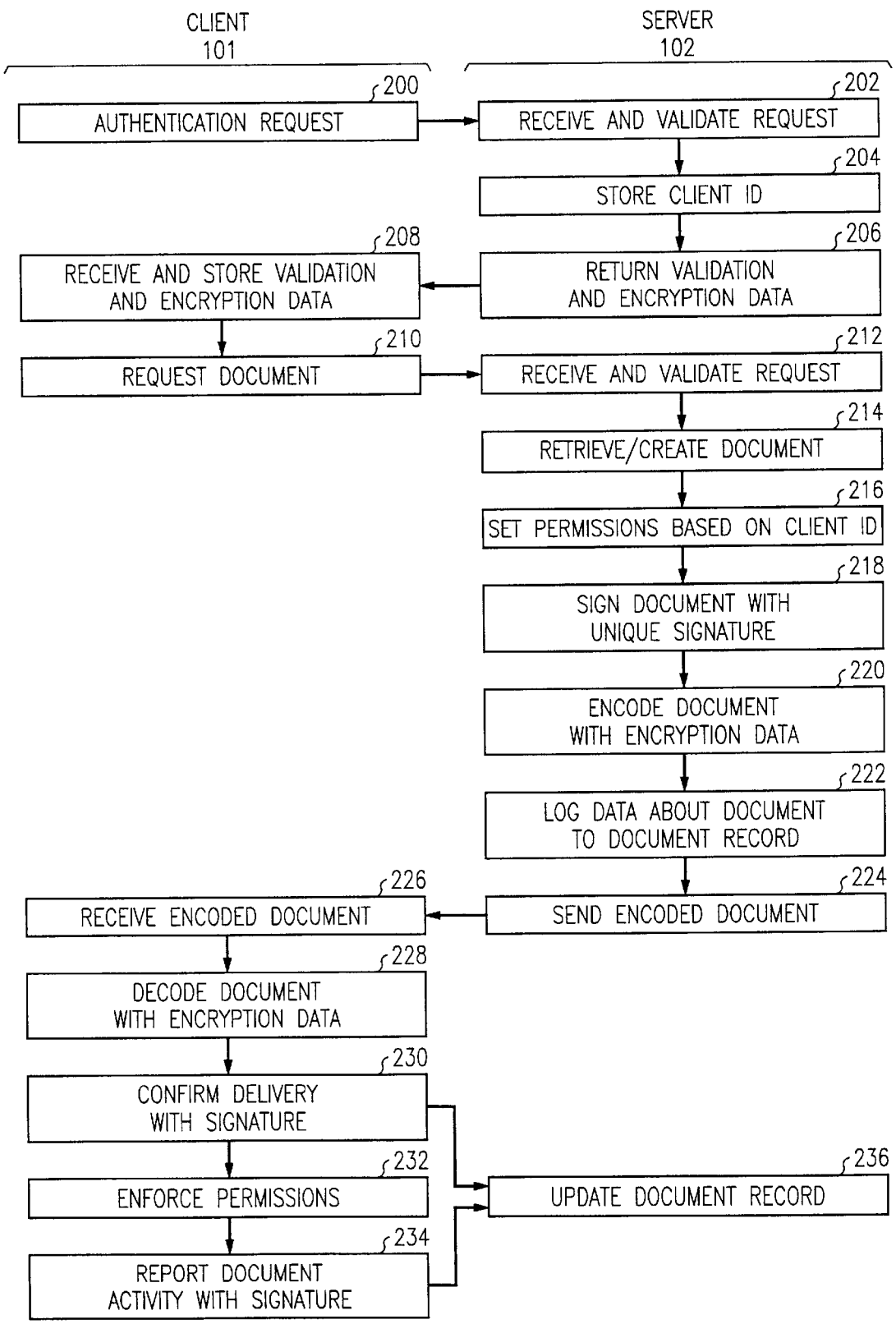

SECURE AND CONTROLLED ELECTRONIC DOCUMENT DISTRIBUTION ARRANGEMENT

TECHNICAL FIELD

This invention relates to electronic distribution of information.

BACKGROUND OF THE INVENTION

The daily volume of information (referred to herein as "documents" and including but not limited to files, data streams, electronic representations of documents, multimedia files, etc.) distributed via electronic networks, including the Internet, intranets, private networks, etc. is large and growing. But distributing documents over the networks may be risky, and even dangerous, because the documents are being distributed by insecure network servers to an insecure environment. Networks do not guarantee successful delivery to only the intended recipient(s), do not provide document tractability, and do not provide sender control over the document once it is distributed. Because of the risks, private, restricted, and/or sensitive documents often are not distributed over networks.

The Adobe Portable Document Format (PDF), which is a de-facto standard for electronic distribution of documents, provides for protection of documents via encryption. It uses the 40 bit RC4 encoding scheme from RSA Corporation. Every protected document must have an encryption dictionary that specifies the security handler to be used to authorize access to the document. The document has two passwords: an "open document" password and a "change security options" password. The change security options password is used to control access to the document: printing, copying text and graphics out of the document, modifying the document, and adding or modifying text notes. When the correct open document password is supplied, the document is opened and decrypted. The change security options password is required to change these passwords and restrictions. The Adobe PDF thereby provides sender control over the document once it is distributed. But it still fails to provide other needed security measures, such as guaranteed successful delivery to only the intended recipient(s), tractability, and advanced control (e.g. document life, document printing, forwarding, archival, etc.). Moreover, such passwords allow the opportunity for brute-force or repeated attacks, which in time allow document integrity to be compromised.

SUMMARY OF THE INVENTION

This invention is directed to solving these and other problems and disadvantages of the prior art. According to the invention, a method of communicating between a client and a server comprises the following steps. In response to receipt of a request for information ("document") from the client, the server sends the information and permissions pertaining to the information, in encrypted form to the client. In response to receipt of the information, the client sends an acknowledgment to the server, decrypts the information, and enforces the permissions with respect to the information and client credentials. In response to activity with respect to the information at the client, the client reports the activity to the server. In response to the receipt of the acknowledgment and the report, the server stores a record thereof. Illustratively, the server validates the request and/or the client in response to receipt of the request and sends the information only upon (successful) validation, while it forbears from sending the information upon a lack of validation.

Preferably, the client authenticates itself with the server by a secure means (e.g., a key, a digital signature, a public-private key, SSL, etc.). The server acknowledges the client and returns confirmation to the client, including encryption keys if appropriate, for this type of transaction. The client then sends a request for a document to the server. Based on client credentials and requested document security settings, the server generates the document, sets permissions, and encrypts it. The server logs information about the client, the document, and the permissions to a database. The server then digitally signs the document and transmits it to the client. Upon receipt of the document, the client transmits an acknowledgment of transmission to the server. The server logs the transmission information. The client decrypts the document based on permission settings set by the server. The client continues to communicate with the server regarding the actions of the client.

Optionally, different classes of clients, with different permissions for different uses can exist. Authentication of the client includes defining the types of transactions that are allowed to the client. The client can have multiple identifiers (IDs) for multiple servers. Different encryption algorithms can be used based on client ID, server environment, and application (higher-security applications, lower-security applications). Initialization of the document system requires that the clients' information be placed in a directory service to be used by the server for validation of clients.

The invention provides for the secure and controlled electronic distribution of documents across a communications network, such as the Internet for example. Advantages attainable therewith include the following:

The document is delivered securely and to only the intended client. Document reception is confirmed by the client via the acknowledgment to the server.

The document and its history and origin are trackable. Each document may contain specific identifiers, signatures, and/or "watermarks" that confirm the validity and the origin of the document. Such characteristics as the issuer, recipient date of origination, intended purpose, etc., may be tracked. The server may also be notified whenever the document is perused, how many times, and by whom.

The document is delivered, and may even be created, automatically, and delivery is confirmed automatically.

The document is controllable. The originator of the document has total control, through the server, of the document throughout the life of the document. Each document has pre-defined and enforced control characteristics (permissions). For example, the originator may or may not allow the document to be viewed, printed, saved, forwarded, or modified, or may set a limit on the maximum number of permitted viewings and printings. The originator may also allow the document to "live" for only a specified amount of time.

The invention can be tailored to substantially any business transaction, including banking, legal processes, certifications, purchases, etc.

The invention can be adapted to any document-based systems such as e-mail and HTML Internet delivery. Furthermore, any transaction that presently requires any exchange of paper can instead use the invention for a secure electronic document exchange.

While the invention has been characterized above in terms of a method, it also encompasses apparatus that performs the method. The apparatus preferably includes an effector—any entity that effects the corresponding step, unlike a means— for each step. The invention further encompasses a computer-readable medium (e.g., a memory device) containing instructions which, when executed in a computer, cause the computer to perform the method steps.

These and other features and advantages of the present invention will become apparent from the following description of an illustrative embodiment of the invention taken together with the drawing.

BRIEF DESCRIPTION OF THE DRAWING

FIG. 2 is a functional flow diagram of operations of the system of FIG. 1.

DETAILED DESCRIPTION

Figure 1:
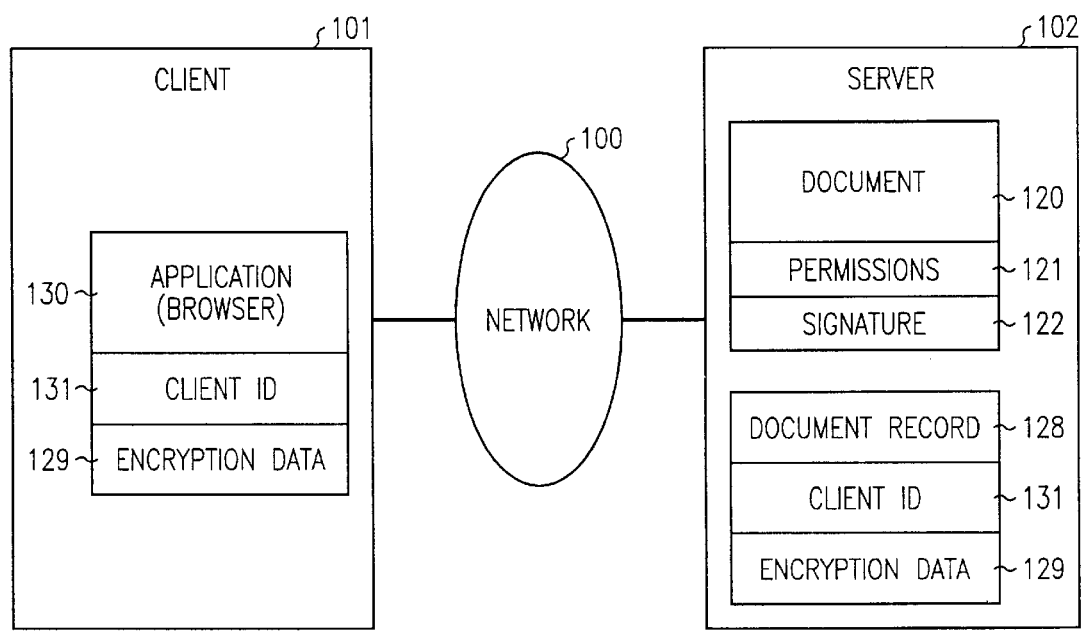
FIG. 1 is a block diagram of an electronic document distribution system that includes an illustrative embodiment of the invention.

FIG. 1 shows an electronic document distribution system that implements the invention. The system includes one or more clients 101 and one or more servers 102 interconnected by a communications network 100 such as the Internet, a private network, etc. Each client 101 and server 102 is illustratively a stored-program-controlled machine, such as a computer, that stores its control programs in a memory device and executes them. Server 102 has documents 120 for use by client 101. Server 102 may have the completed, formatted, documents 120. Or, it may have files of document information plus document templates which it uses to assemble documents 120, as is well known in the art. Client 101 has an application 130 for obtaining documents from server 102, and a client ID 131 that uniquely identifies client 101. In order to support secure and controlled electronic document distribution, application 130 is either a special-purpose browser or a conventional application. Client 101 may have multiple client IDs 131 for communicating with multiple servers 102.

The operation of the system of FIG. 1, or more specifically of client 101 and server 102 thereof, is shown in FIG. 2. To obtain a document 120 from server 102, application 130 of client 101 first sends an authentication request including its client ID 131 to server 102, at step 200. Server 102 receives the request and validates it, at step 202, for example by checking with a directory service or its own records whether client 101 is entitled to receive documents 120. Upon determining that the request is valid, server 102 stores client ID 131 for later use, at step 204, and sends validation of identity to client 101 along with any encryption data 129 that may be needed by client 101 to obtain documents 120, at step 206, which is received and stored by client 101 at step 208. Steps 206 and 208 serve to establish a secure point-to-point connection between server 102 and client 101. If it determines at step 202 that the request is not valid, server 102 forbears from performing steps 204 et seq.

Upon establishment of a secure connection between client 101 and server 102, at steps 206 and 208, application 130 of client 101 sends to server 102 a request for a particular document 120, at step 210, accompanied by its client ID 131. Server 102 receives the request and validates it, at step 212, for example by comparing received client ID 131 against its stored client ID 131 for client 101, and by checking its records for whether client 101 is entitled to receive the requested document 120. If it is determined that the request is not valid, server 102 forbears from performing steps 214 et seq. Upon validating the request, server 102 retrieves the requested document 120 if it is already completed, or generates the requested document 120 from an information file and a document template if it is not completed, at step 214. Server 102 uses ID 129 to set permissions 121 of client 101 for document 120, at step 216. Permissions 121 specify what receiving client 101 is entitled to do with document 120. For example, they specify whether client 101 is allowed to view, print, and/or write document 120, and if so, how many times; whether client 101 is allowed to save document 120; how long document 120 is allowed to "live" (i.e., exist, before being automatically destroyed by application 130); etc. Having set permissions 121, server 102 signs document 120 with a unique signature 122, e.g., appends a unique serial number thereto, at step 218. Server 102 then encodes the entire document 120 by using encryption data 129, at step 220. Server 102 creates a document record 128 for document 120 and logs therein data about the document, e.g., its signature 122, permissions 121, receiving client 101, time of delivery, etc., at step 222. Server 102 then sends the encoded document 120 to client 101, at step 224.

Upon receipt of encoded document 120, at step 226, application 130 of client 101 decodes document 120 by using encryption data 129 that it received at step 208, at step 228, and sends confirmation of delivery of document 120 with the document's signature 122, which serves as authentication of the confirmation, back to server 102, at step 230. Server 102 receives the confirmation and uses its contents to update document record 128 of document 120, e.g., to log the confirmation and time of its receipt, at step 236.

Application 130 is charged with enforcing permissions 121 of document 120, at step 232. That includes disabling any actuators that a user of client 101 may use, or any commands that another application program of client 101 may issue, until application 130 has checked permissions 121 and confirmed that the action with respect to document 120 that is represented by that actuator or command is allowed. It may also include destroying document 120 once its allotted "lifetime" expires. Preferably, application 130 keeps decoded document 120 stored only in volatile memory (RAM) of client 101 that is dedicated (locked) to application 130 and nowhere else, so as to minimize the possibility of unauthorized access being gained to document 120. Anytime that a transaction involving document 120 is effected on client 101, application 130 reports this transaction along with the document's signature 122 to server 102, at step 234. Server 102 uses this information to update document record 128 of document 120, at step 236. Server 102 thus has a complete log of all activity involving document 120.

Of course, various changes and modifications to the illustrative embodiment described above will be apparent to those skilled in the art. For example, if client 101 is unknown to server 102, a separate directory service may be queried as part of step 202 before processing the authentication request. Client 101 would have to register with the directory service as part of client 101 installation. Also, this invention may be used as a means for distributing the electronic equivalent of U.S. Postal Service Registered or Certified Mail. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of communicating comprising:

establishing a secure connection between a client and a server;

the client sending a request for information accompanied by an identifier of the client (client ID) to the server over the secure connection;

in response to receiving the request and the client ID, the server validating the client ID and validating the request with respect to the client ID:

in response to the validating, the server using the client ID to generate permissions of the client pertaining to the information;

the server encrypting the information;

in response to the validating, the server sending the permissions and the encrypted information accompanied by a unique signature for the sent information to the client over the secure connection;

the server storing a record associated with the unique signature, of data about the sent information including the client ID and the permissions;

in response to a lack of the validating, the server forbearing from sending the information to the client;

in response to receiving the encrypted information, signature, and permissions, the client sending an acknowledgement of the receipt accompanied by the signature to the server over the secure connection;

in response to receiving the acknowledgement and the unique signature, the server logging the receipt in the record associated with the signature;

the client decrypting the received encrypted information;

the client enforcing the received permissions with the respect to the received information;

in response to activity with respect to the received information at the client, the client sending a report of the activity accompanied by the signature to the server over the secure connection; and in response to receiving the report, the server logging the activity in the document record associated with the signature.

2. The method of claim 1 wherein:

establishing a secure connection comprises the client sending an authentication request accompanied by the client ID to the server;

in response to receipt of the authentication request and the client ID, the server validating the client ID;

in response to validating the client ID, the server sending a validation to the client; and in response to a lack of validating of the client ID, the server forbearing from sending the validation to the client.

3. The method of claim 2 wherein:

the server sending a validation to the client comprises the server sending encryption data to the client; and the client decrypting the received encrypted information comprises the client using received said encryption data to decrypt the received encrypted information.

4. A method of communicating comprising:

establishing a secure connection between a client and a server;

in response to receiving from the client over the secure connection a request for information accompanied by an identifier of the client (client ID), the server validating the client ID and validating the request with respect to the client ID;

in response to validating the client ID and the request, the server using the client ID to generate permissions of the client pertaining to the information, for enforcement by the client with respect to the information;

the server encrypting the information;

in response to the validating, the server sending the permissions and the encrypted information accompanied by a unique signature for the sent information to the client over the secure connection;

the server storing a record associated with the signature, of data about the sent information including the client ID and the permissions;

in response to a lack of the validating, the server forbearing from sending the information to the client;

in response to receiving from the client over the secure connection an acknowledgement of receipt by the client of the encrypted data, signature, and permissions, accompanied by the signature, the server logging the receipt in the record associated with the signature; and in response to receiving from the client over the secure connection of a report of activity at the client with respect to the information accompanied by the signature, the server logging the activity in the record associated with the signature.

5. The method of claim 4 wherein:

establishing a secure connection comprises in response to receiving an authentication request accompanied by the client ID from the client, the server validating the client ID;

in response to validating of the client ID, the server sending a validation to the client; and in response to a lack of validating of the client ID, the server forbearing from sending the validation to the client.

6. The method of claim 5 wherein:

the server sending a validation to the client comprises the server sending encryption data to the client for use by the client in decrypting the received encrypted information.

7. A method of communicating comprising:

establishing a secure connection between a client and a server;

sending a request for information accompanied by an identifier of the client (client ID) from the client to the server over the secure connection;

in response to receiving from the server over the secure connection encrypted said information, a unique signature for the received information, and permissions of the client with respect to the information, said receiving being indicative of validation by the server of the client ID and of the request with respect to the client ID, the client sending an acknowledgement of the receipt accompanied by the signature to the server over the secure connection for logging of the acknowledgement in, a record and associated with the signature, of data about the sent information;

the client decrypting the received encrypted information;

the client enforcing the received permissions with request to the received information; and in response to activity with respect to the received information at the client, the client sending a report of the activity accompanied by the signature to the server over the secure connection for logging of the activity by the server in the record associated with the signature.

8. The method of claim 7 wherein:

establishing a secure connection comprises the client sending an authentication request accompanied by the client ID to the server; and the client receiving from the server a validation that indicates that the server has received the authentication request and the client ID and has validated the received client ID.

9. The method of claim 8 wherein:

receiving from the server a validation comprises the client receiving from the server encryption data; and the client decrypting the received encrypted information comprises the client using received said encryption data to decrypt the received encrypted information.

10. A computer readable medium containing instructions which, when executed in a computer, cause the computer to perform the method of one of the claims 1–9.

11. An apparatus for communicating comprising:

means for establishing a secure connection between a client and a server;

means in the client for sending a request for information accompanied by an identifier of the client (client ID) to the server over the secure connection;

means in the server responsive to receipt of the request and the client ID, for validating the client ID and validating the request with respect to the client ID:

means in the server responsive to the validating, for using the client ID to generate permissions of the client pertaining to the information;

means in the server for encrypting the information;

means in the server responsive to the validating, for sending the permissions and the encrypted information accompanied by a unique signature for the sent information to the client over the secure connection, and responsive to a lack of the validating, for forbearing from sending the information to the client;

means in the server for storing a record associated with the unique signature, of data about the sent information including the client ID and the permissions;

means in the client responsive to receiving the encrypted information, signature, and permissions, for sending an acknowledgement of the receipt accompanied by the signature to the server over the secure connection;

means in the server responsive to receiving the acknowledgement and the unique signature, for logging the receipt in the record associated with the signature;

means in the client for decrypting the received encrypted information;

means in the client for enforcing the received permissions with respect to the received information;

means in the client responsive to activity with respect to the received information at the client, for sending a report of the activity accompanied by the signature to the server over the secure connection; and means in the server responsive to receiving the report, for logging the activity in the document record associated with the signature.

12. The apparatus of claim 11 wherein:

means for establishing a secure connection comprise means in the client for sending an authentication request accompanied by the client ID to the server;

means in the server responsive to receipt of the authentication request and the client ID for validating the client ID; and means in the server responsive to validating the client ID, for sending a validation to the client, and responsive to a lack of validating of the client ID, for forbearing from sending the validation to the client.

13. The apparatus of claim 12 wherein:

the means for sending a validation to the client comprise means in the server for sending encryption data to the client; and the means for decrypting the, received encrypted information comprise means in the client for using received said encryption data to decrypt the received encrypted information.

14. A server for communicating with a client, comprising:

means for establishing a secure connection between the client and the server;

means responsive to receiving from the client over the secure connection a request for information accompanied by an identifier of the client (client ID), for validating the client ID and validating the request with respect to the client ID;

means responsive to validating the client ID and the request, for using the client ID to generate permissions of the client pertaining to the information, for enforcement by the client with respect to the information;

means for encrypting the information;

means responsive to the validating, for sending the permissions and the encrypted information accompanied by a unique signature for the sent information to the client over the secure connection, and responsive to alack of the validating, for forbearing from sending the information to the client;

means for storing a record associated with the signature, of data about the sent information including the client ID and the permissions;

means responsive to receiving from the client over the secure connection an acknowledgement of receipt by the client of the encrypted data, signature, and permissions, accompanied by the signature, for logging the receipt in the record associated with the signature; and means responsive to receiving from the client over the secure connection of a report of activity at the client with respect to the information accompanied by the signature, for logging the activity in the record associated with the signature.

15. The server of claim 14 wherein:

the means for establishing a secure connection comprise means responsive to receiving an authentication request accompanied by the client ID from the client, for validating the client ID; and means responsive to validating of the client ID, for sending a validation to the client, and responsive to a lack of validating of the client ID, for forbearing from sending the validation to the client.

16. The server of claim 15 wherein:

the means for sending a validation to the client comprise means for sending encryption data to the client for use by the client in decrypting the received encrypted information.

17. A client for communicating with a server, comprising:

means for establishing a secure connection between the client and the server;

means for sending a request for information accompanied by an identifier of the client (client ID) from the client to the server over the secure connection;

means responsive to receiving from the server over the secure connection encrypted said information, a unique signature for the received information, and permissions of the client with respect to the information, said receiving being indicative of validation by the server of the client ID and of the request with respect to the client ID, for sending an acknowledgement of the receipt accompanied by the signature to the server over the secure connection for logging of the acknowledgement in a record, associated with the signature, of data about the sent information;

means for decrypting the received encrypted information;

means for enforcing the received permissions with request to the received information; and means responsive to activity with respect to the received information at the client, for sending a report of the activity accompanied by the signature to the server over the secure connection for logging of the activity by the server in the record associated with the signature.

18. The client of claim 17 wherein:

the means for establishing a secure connection comprise means for sending an authentication request accompanied by the client ID to the server; and means for receiving from the server a validation that indicates that the server has received the authentication request and the client ID and has validated the received client ID.

19. The client of claim 18 wherein:

the means for receiving from the server a validation comprise means for receiving from the server encryption data; and the means for decrypting the received encrypted information comprises means for using received said encryption data to decrypt the received encrypted information.

\* \* \* \* \*